Jan. 17, 1961 D. PARRETT 2,968,369
COMBINED RETARDER AND AUXILIARY BRAKE
Filed Aug. 6, 1959 4 Sheets-Sheet 2
FIG. 2.
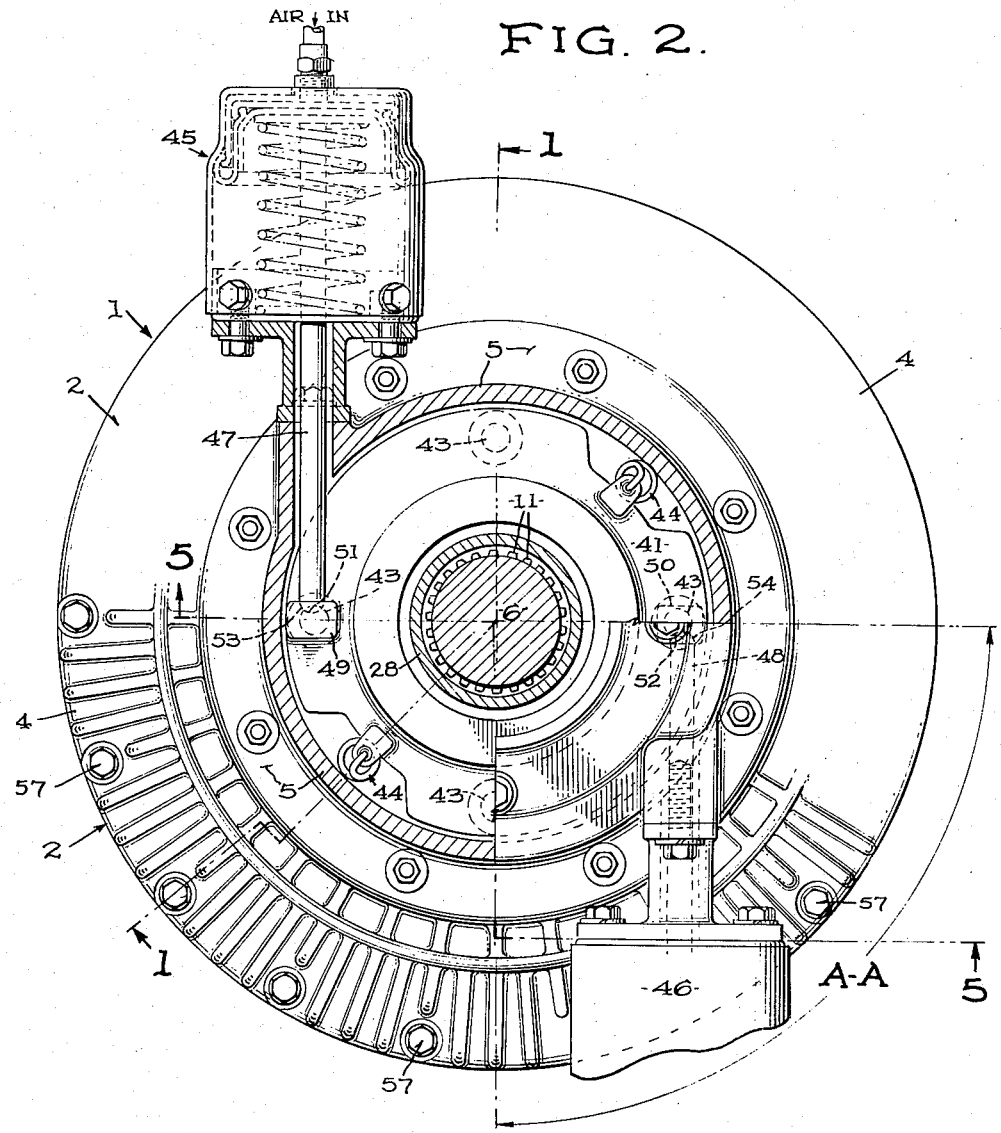
INVENTOR
DENT PARRETT
ATTORNEYS Jan. 17, 1961 D. PARRETT 2,968,369
COMBINED RETARDER AND AUXILIARY BRAKE
Filed Aug. 6, 1959 4 Sheets-Sheet 3

INVENTOR
DENT PARRETT
BY
ATTORNEYS

Jan. 17, 1961 D. PARRETT 2,968,369
COMBINED RETARDER AND AUXILIARY BRAKE
Filed Aug. 6, 1959 4 Sheets-Sheet 4

INVENTOR
DENT PARRETT
BY
ATTORNEYS

United States Patent Office 2,968,369
Patented Jan. 17, 1961

2,968,369
COMBINED RETARDER AND AUXILIARY BRAKE

Dent Parrett, St. Joseph, Mich., assignor, by mesne assignments, to Lambert Brake Corporation, St. Joseph, Mich., a corporation of Michigan Filed Aug. 6, 1959, Ser. No. 832,055

16 Claims. (Cl. 188—72)

The present invention relates to brakes, and more particularly to an improved form of combined retarder and emergency or auxiliary disc brake of the servo type which is adaptable for use in controlling a vehicle drive shaft or for retarding and braking rotatable shaft-driven members of various kinds.

More specifically, this invention relates to a novel clutch-activated retarder and auxiliary brake combination wherein a disc-type clutch means is adapted for mounting within the over-all retarder and brake assembly and around a rotatable drive shaft for effectively activating and deactivating one or more rotary brake members relative to the rotary drive shaft.

In previous rotary disc type retarder or brake constructions, the rotor friction discs are generally continuously driven, either indirectly or directly, as by a rotary drive shaft or a rotary housing or other member, when the vehicle or apparatus is in operation. Even when the brake or retarder elements are in the non-engaged or released condition, there is always some undesirable drag, with consequent loss of efficiency and horsepower output, occasioned by the friction of the moving parts against the non-moving parts. This is more particularly true in brakes and retarders of the multiple disc type.

Accordingly, it is a primary object of this invention to provide a combined retarder and auxiliary or emergency disc brake assembly which, in overcoming the foregoing disadvantages, is adaptable for vehicle or other apparatus drive shaft mounting, and which embodies a built-in clutch means for selectively effecting rotation or for preventing rotation of a rotary brake member with a rotary drive shaft.

Another object of this invention is to provide a clutch assembly which is arranged in a novel manner within a combined retarder and auxiliary brake assembly upon a transmission drive shaft of a vehicle, apart from the normal service brakes, and which is operative to interrupt the drive of the normally driven rotor friction discs of the combined retarder and auxiliary brake assembly when the brake is in a non-applied condition, without interrupting the drive torque to the vehicle wheels and without requiring disengagement of the main clutch of the vehicle.

Still another object is to provide an improved drive-shaft-mounted retarder and emergency brake combination embodying a clutch assembly which is operative to permit retarding of the drive shaft only when the clutch is in an engaged condition.

Yet another object is to provide an improved drive-shaft-mounted combined retarder and emergency brake assembly embodying a clutch assembly therein which is selectively operable to effect the rotation or non-rotation of a rotary brake member with a rotary drive shaft, wherein both the brake and clutch assemblies utilize a ball-and-ramp self-energizing principle, thus providing a single retarder unit which performs the compound function of retarding, as well as of emergency and/or auxiliary braking.

In attaining the foregoing objectives, a power transmitting stub drive shaft, having a hollow clutch housing assembly coaxially and rotatably mounted thereabout, is adapted to be operatively connected at one end to the change-speed power transmission of the vehicle as by means of a universal coupling member splined on said stub shaft so as to be rotatably driven thereby, and at the other end with a flanged coupling provided thereon for connection with the main drive or propellor shaft which extends to the rear wheel drive.

Approximately midway between the universal coupling member and the flanged coupling, the stub drive shaft is provided with a splined area for driving an axially shiftable clutch rotor disc mounted thereon which, in turn, engages co-operatively with the friction faces of adjacently disposed clutch elements on each side thereof. The clutch elements, when engaged, will effect the transmission of the rotary motion of the stub drive shaft to at least one brake rotor friction disc which is supported or carried upon the outer periphery of the hollow rotatable clutch housing. Co-operative with this brake rotor disc are a plurality of relatively stationary brake parts which serve to apply a retarding or braking action on the aforementioned rotor disc, and in turn to the drive shaft.

A composite hollow housing surrounds the brake and clutch components and is supported on suitable bearings interposed between it and the drive shaft.

A still further object of the invention is to provide a novel combined retarder and brake assembly primarily for use on commercial trucks and which is capable of efficiently replacing the more expensive, heavy and cumbersome transmission retarders currently being used on large commercial vehicles. This objective can be achieved by employing, along with my novel clutch type operating means, an inherently ruggedly constructed brake, said brake preferably being of the self-energizing type to assure the necessary stopping power, and also preferably being of the oil-cooled type in order to efficiently dissipate the heat energy generated by the retarding and/or braking of heavily loaded commercial vehicles of this type.

Other objects and advantages will be described or will become apparent to those skilled in the art in the following detailed description of this invention, and the novel features thereof will be defined in the appended claims.

In the drawings:

Fig. 2 is a composite sectional and elevational view of the brake assembly and clutch actuator means, as seen from the back end substantially on line 2—2 of Fig. 1, with the lower right hand quadrant or sector designated A—A shown substantially as viewed on line A—A of Fig. 1;

Figure 6:
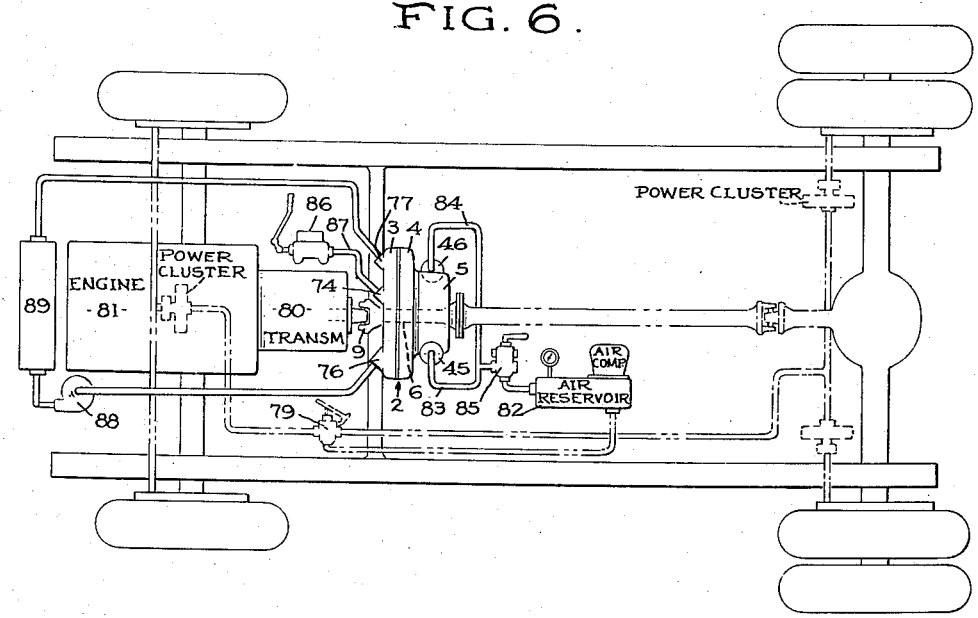

Like reference characters designate corresponding parts throughout the several figures of the drawings, wherein for the purpose of illustrating one practical embodiment of my invention, the assembled combined retarder and brake unit, designated generally at 1, comprises a composite sectional housing 2 which includes front, intermediate and back or rearward housing sections 3, 4 and 5, respectively. Within said housing there is journalled a power transmitting stub drive shaft 6 by means of a suitable bearing assembly 7 interposed between the inner periphery of the rearward housing section 5 and the drive shaft 6, and another bearing assembly 8 which is interposed between the inner periphery of the front housing 3 and the outer diameter of the hub of a universal coupling member 9 splined to the freely extended and complementary splined front end 10 of drive shaft 6. The universal coupling member 9 which connects with a complementary member on the transmission stub shaft, as schematically illustrated in Fig. 6, is maintained in axially spaced relation to clutch rotor-driving splines 11, which are provided approximately midway intermediate the ends of stub drive shaft 6, by means of a spacer 12 against which said coupling is restrained in axially fixed relation thereto by means of nut 13. The bearing assemblies 7 and 8 afford free rotation of the drive shaft 6 within the stationary mounted housing 2.

The front housing section 3 has a stepped axially extended sleeve 14 adjacent the bearing assembly 8 and projecting rearwardly within the housing in concentric spaced relationship to the hub of drive-shaft-mounted universal coupling member 9.

Spaced rearwardly of the sleeve 14 and upon the driving splines 11, is carried an axially movable clutch rotor disc 15 preferably having suitable lining segments 16, 16 affixed to opposite faces thereof. A combined clutch-disc-housing and brake rotor-friction-disc carrier 17 is rotatably supported upon a bearing assembly 19, with an oil seal 18 disposed contiguously inwardly thereof and both of which are carried upon sleeve 14 adjacent to one side of clutch rotor disc 15. The said carrier 17 comprises a radially extended disc or clutch pressure plate 17' having a flat clutch face 20 for engagement with the contiguous friction lining 16 of clutch rotor disc 15, said clutch pressure plate 17' terminating in a rearwardly and axially extended clutch housing and brake rotor-friction-disc splined carrying flange 21. A gasketed preferably annular secondary clutch disc or back-up plate 22 also forms part of the clutch housing and is removably secured as by bolt and nut assemblies 22' to the free end of flange 21 in opposed spaced relation to the clutch face 20. Said secondary disc 22 terminates at its inner periphery in a sleeve or flange 23 which extends axially rearward and away from the universal coupling aforesaid. The said flange 23 provides a seat or support on its outer periphery for a suitable bearing assembly 24 and rotary seal 25 disposed between it and a concentric flanged portion 26 extending axially from a radially inwardly extended stationary actuator pressure plate 27 which, in turn, is a part of the intermediate housing portion 4, said bearing assembly 24 affording free rotation of the clutch housing 17, 21, 22. The seals 25 and 18 retain the cooling fluid within the intermediate and forward portions 4 and 3 respectively, of the composite housing 2 while precluding said cooling fluid from entering into the clutch housing.

Additionally, the aforesaid tubular flange 23 slidingly engages and supports, within its inner diameter, an axially extended and axially movable tubular clutch actuator or operator sleeve 28 which is retained in concentric spaced relation to the drive shaft 6. The clutch actuator sleeve 28 extends axially within the combined clutch housing and rotor disc carrier 17 and has a preferably annular primary clutch disc 29 slidably retained on the end of said sleeve 28, as by means of a snap ring 30. The primary disc 29 has on one side a flat clutch face 31 disposed adjacent to lining 16 of the rotor clutch disc 15. The other side of the primary disc 29 is provided with circumferentially and preferably alternately disposed spring seat retaining bosses 32 and ramped camming ball seats or inserts 33 respectively. Complemental spring seat retaining bosses 34 and ramped camming ball seats or inserts 35 are provided in opposed spaced relationship to bosses 32 and inserts 33, respectively, upon the forward facing radial wall of the opposed secondary clutch disc or back-up plate 22, aforesaid. Therefore, it becomes apparent that by interposing concentric compression coil spring means 36 and self-energizing balls 37 between the respective spring seat retaining bosses 32, 34 and the camming inserts 33, 35, respectively, there is provided a self-energizing, spring-loaded clutch primary disc 29, which is constantly urged into engagement with the clutch rotor disc 15 and clutch face 20.

The other end of the clutch operator sleeve 28 carries a thrust bearing assembly 38 which is held against axial displacement relative to said sleeve 28 by any suitable means such as snap rings 39 and 40. Abutting against this bearing assembly 38 and disposed intermediate it and the clutch actuator pressure plate 27, is a clutch actuator disc 41 which is axially and rotatably piloted upon a shoulder 42 on the pressure plate 27, as well as upon a plurality of ramped-insert and ball-camming means 43, which are complementally disposed in both the clutch actuator pressure plate 27 and in the actuator disc 41. Spring means 44 act to hold the actuator disc 41 and camming means 43 in proper assembly with pressure plate 27.

To disengage the normally engaged clutch, separate means are provided to rotate the clutch actuator disc 41 relative to stationary clutch pressure plate 27 so as to initiate a camming of the disc 41 away from plate 27, although this could be achieved by the same hydraulic means used to apply the combined retarder and auxiliary brake. Preferably, two identical conventional air actuated piston and cylinder assemblies 45 and 46 are utilized for this purpose. As best seen in Fig. 2, the air cylinder assemblies are mounted on diametrically opposed positions of the rearward housing section 5 and in a parallel manner to each other so that the piston thrust arms 47 and 48, of the respective air cylinder assemblies 45 and 46, extend into the interior of the housing and operate substantially parallel to each other but in opposite directions against their respective diametrically opposed thrust pads or abutments 49 and 50. The free ends 51 and 52 of the respective piston arms are preferably rounded and seat in complemental recessed seats 53 and 54 in their respective abutments 49 and 50, thus assuring a universal abutting engagement therewith irrespective of the rotated position of the clutch actuator disc 41.

As the clutch actuator disc 41 is cammed away from plate 27, responsive to the relative rotation and ramp-and-ball action imparted thereto by the action of the thrust arms 47 and 48, it (disc 41) carries with it against the pressure of the clutch spring assemblies 36 the adjacent thrust bearing 38, the attached actuator sleeve 28 and the clutch primary disc 29 affixed to the other end of actuator sleeve 28. Accordingly, disengagement of the clutch is achieved whereby only the drive shaft 6 and clutch rotor disc 15 are free to rotate, thus eliminating unnecessary drag of moving parts (the brake rotor discs) with the non-moving parts (the brake stator discs).

In order to retard or brake the drive shaft 6, the clutch must be engaged. This is accomplished by releasing the air pressure in the air cylinders 45 and 46, thus permitting the clutch actuator disc 41 and camming means 43 to return to their original uncammed position, partly responsive to the action of return springs 44, coincident to the pull of the spring loaded clutch engaging spring means 36. As the clutch spring means 36 effect frictional inter-engagement of the primary clutch disc 29 with the clutch rotor disc 15 and housing clutch face 20, attendant drag torque of the rotary clutch disc 15 is imparted to the primary clutch disc 29 which, in turn, activates the self-energizing camming means, 33, 35 and 37 in the well-known servo manner. Thereupon, the brake rotor friction discs 55, which are alternately interleaved with a plurality of stator discs 56 and which are complementally splined to the outer periphery of flange 21 of the combined clutch disc-housing and brake rotor-friction-disc carrier 17, are set into rotary motion along with the drive shaft 6, and the over-all assembly 1 is then in condition for retarding or braking of said drive shaft. It is to be understood that an assembly embodying only a single brake rotor disc disposed between one pair of brake stator discs may be utilized if so desired.

Figure 1:
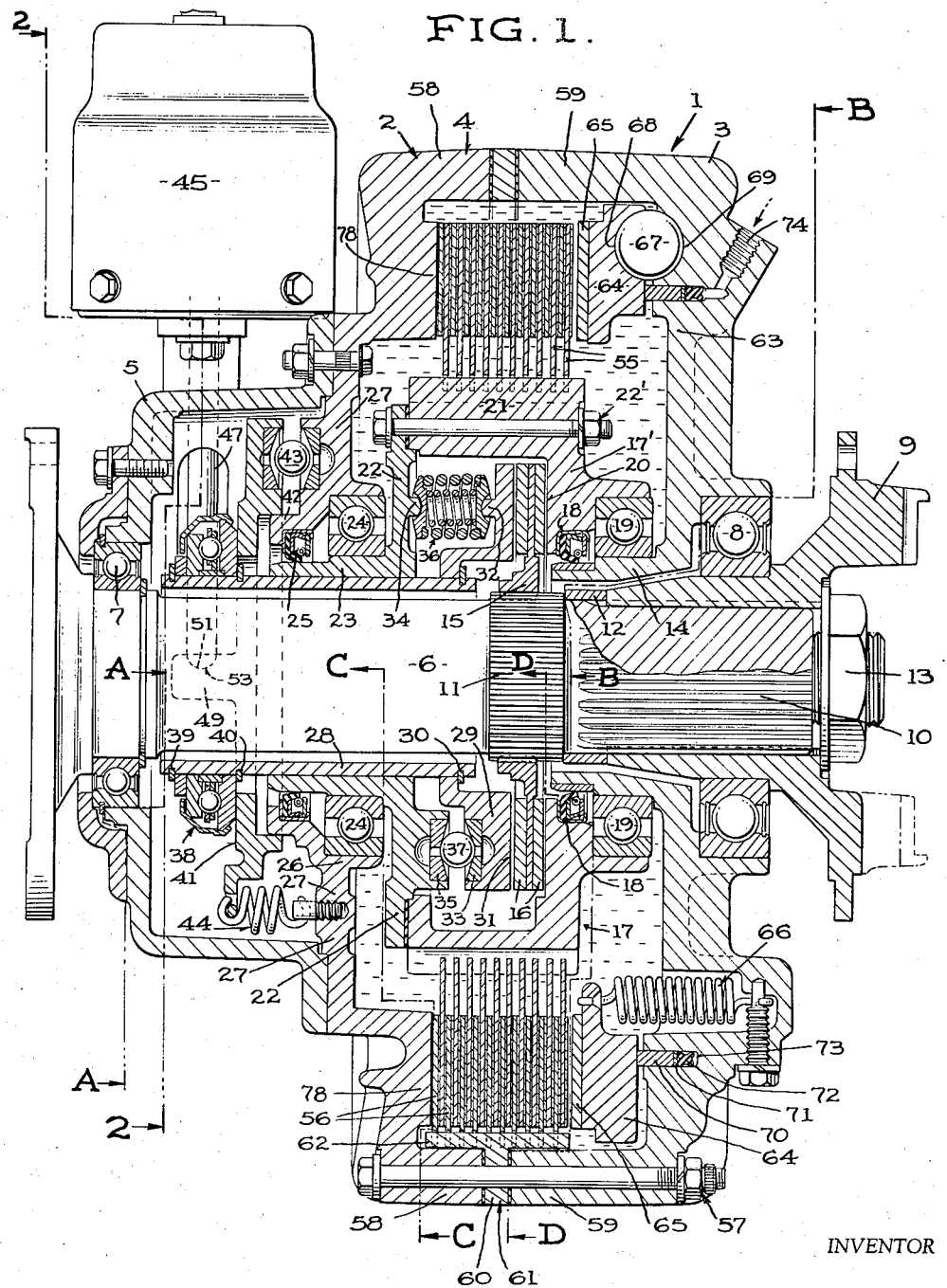
Fig. 1 is a cross-sectional view illustrative of a typical heavy duty, servo-type, fluid-cooled disc brake embodying the features of the invention, said brake being in the non-applied condition, with certain parts shown in full elevation, as seen substantially on line 1—1 of Figs. 2 and 3.

Now coming to a more detailed description of the remainder of the brake, the brake housing sections or members 4 and 3 are preferably removably secured together at their outer peripheries by means of a plurality of circumferentially disposed bolt and nut assemblies 57, and form the major portion of the hollow composite brake housing 2 per se. Gasketed and gripped between axially extended complemental flanges 58 and 59 of housing sections 4 and 3, respectively, is the radially extended rib 60 of a stator carrier, or anchor ring 61, which is generally T-shaped in cross-section as taken through one of the plurality of circumferentially spaced anchoring flanges 62 (best seen in Fig. 1). The front-most housing section 3 comprises a radially extended back-up plate 63 which terminates in the axially extended flange 59 on its outer periphery and in the axially extended flange or sleeve 14 at its inner periphery, both having been described hereinbefore.

A brake primary actuator disc 64, having a friction face 65, is interposed between the stack of interleaved stator and rotor friction discs and the radial wall or back-up plate 63 of housing section 3, with friction face 65 disposed in closely adjacent but spaced relation to the friction disc pack. Said primary disc 64 is disposed for both axial and slight rotative movements and is maintained in semi-floating relationship to the disc pack and to the housing back-up plate 63 by means of a plurality of circumferentially and preferably alternately spaced return springs 66 and camming balls 67, the latter of which seat in complementary ramped seats 68 and 69 which are generated or otherwise formed in opposed relation in the actuator disc 64 and housing wall 63, respectively.

Figure 3:
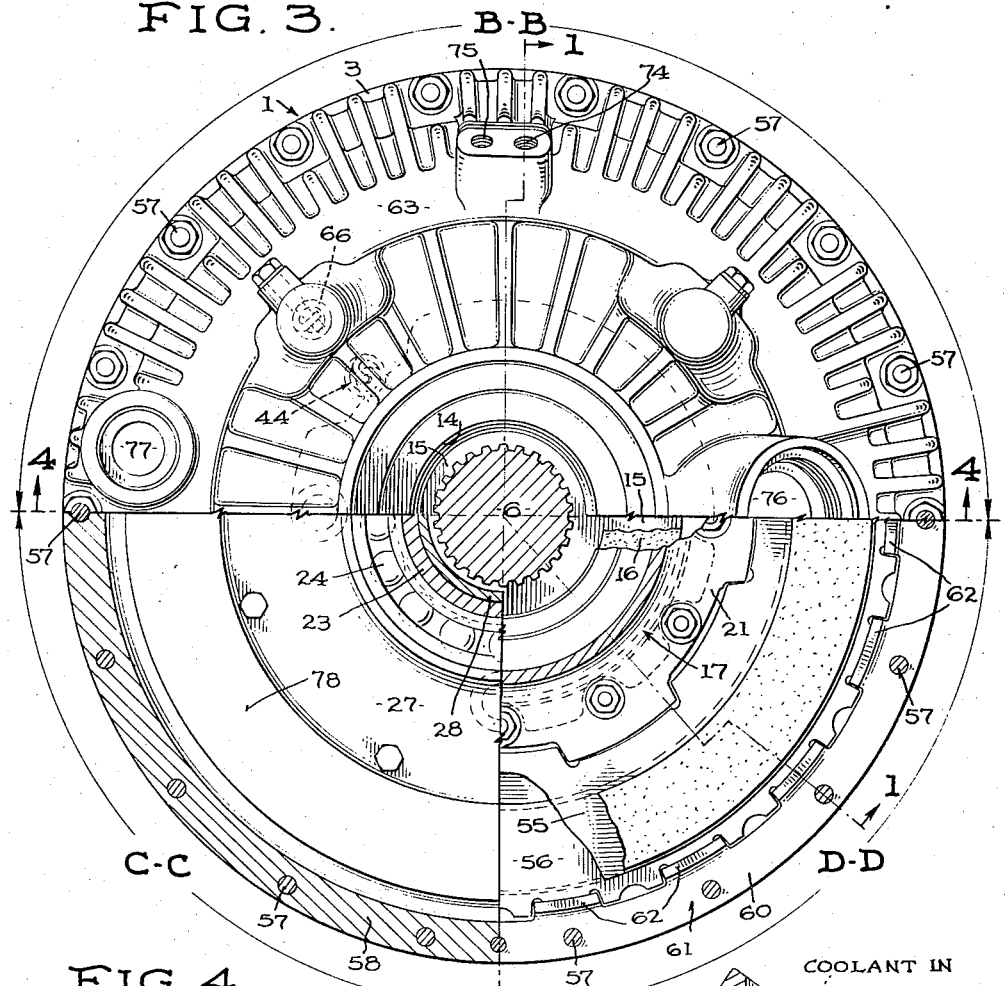
Fig. 3 is also a composite sectional and elevational view of the brake assembly as seen from the front end thereof, with the top half sector shown substantially in full elevation as taken on line B—B of Fig. 1, while the sectors or quadrants C—C and D—D are different cross-sectional views as seen substantially on lines C—C and D—D respectively of Fig. 1.
Figure 4:
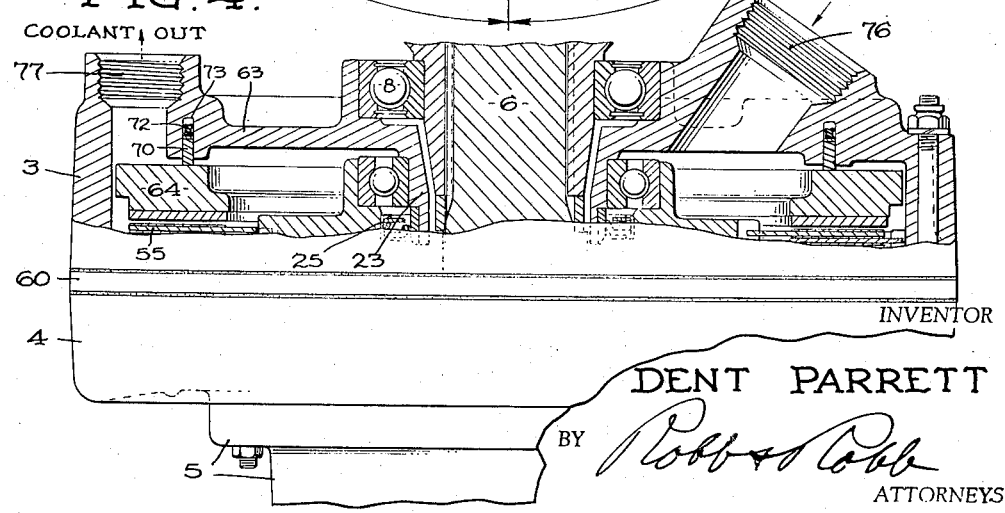
Fig. 4 is a fragmentary view, partly in cross-section and partly in elevation, as taken substantially on line 4—4 of Fig. 3, and more clearly illustrating the brake housing coolant entry and return ports.
Figure 5:
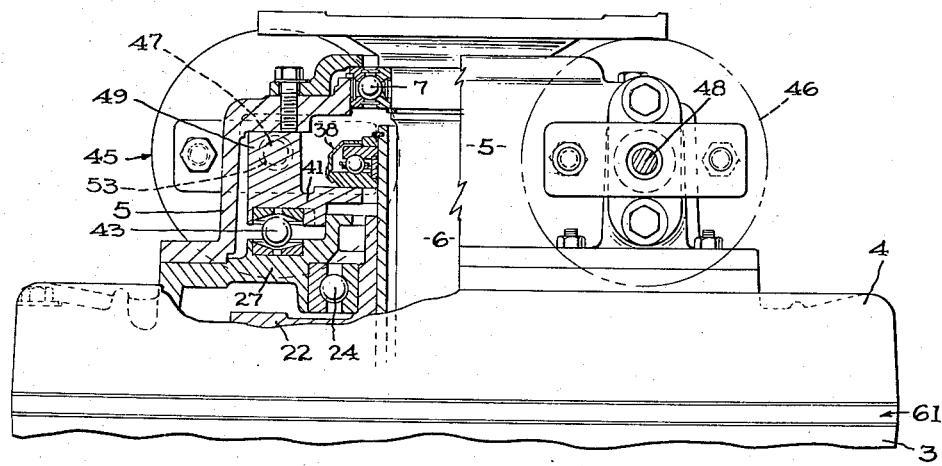
Fig. 5 is a fragmentary view, partly in cross-section and partly in elevation, as taken substantially on line 5—5 of Fig. 2; and, Fig. 6 is a schematic plan view showing one typical control and cooling system for this drive shaft-mounted brake installation, in conjunction with a typical service brake system of a truck or similar vehicle, the latter system being shown in broken lines.

The forward housing section 3 is also provided with a hydraulic operator assembly comprising an annular operator piston 70, a flat annular back-up washer 71 and a resilient annular seal 72 all disposed for axial movements within an annular piston cylinder 73. Connecting with annular piston cylinder 73 is a hydraulic fluid inlet port 74 and an adjacent bleed port 75 (seen in Fig. 3) in which a conventional bleed screw valve (not shown) is to be mounted. Also provided in the housing section 3 is a pair of substantially diametrically opposed liquid coolant inlet and outlet ports 76 and 77, better seen in Figs. 3 and 4, to be discussed in more detail hereinafter.

In operating the retarder or brake, after the clutch-activated rotor discs have been set into motion upon engagement of the clutch, hydraulic operating pressure fluid is directed under pressure port 74 to cause the annular piston 70 to be moved axially against primary actuator disc 64. As primary disc 64 is urged into engagement with the interleaved rotor and stator friction discs (55 and 56), said discs slide as a pack axially toward and inter-engage against the stationary outer radially extended pressure plate portion 78 of intermediate housing section 4. Coincident with and responsive to the rotary drag torque of the adjacent rotor disc 55, primary disc 64 begins to rotate, causing the balls 67 to ride up their respective ramped seats to cam said primary disc 64 into harder frictional engagement with the friction discs in a well-known servo manner.

Fig. 6 illustrates schematically a composite conventional service brake system (shown in dotted outline) and the combined retarder and auxiliary brake arrangement of this invention, including the pneumatic clutch control system and a typical circulating brake coolant system, all of which will now be described generally.

The conventional service brake system is shown (in dotted outline) as comprising a foot-operated master cylinder 79 which operatively directs the hydraulic brake fluid to all of the service wheel brakes.

The improved drive-shaft-mounted combined retarder and auxiliary brake assembly 1 of this invention is shown mounted on the drive shaft 6 adjacent the transmission 80 of a motor 81. Pneumatic clutch operating air cylinders 45 and 46 are operatively connected to a source of air pressure 82 by means of lines 83 and 84, respectively, which connect with an operator valve 85 before leading to the air reservoir 82.

A separate source of preferably hydraulic operating fluid is provided in the form of a hand actuated master cylinder 86 which is connected with the retarder operating inlet port 74, as by line 87. Master cylinder 86 may be actuated to apply the retarder only after the brake rotor discs have become rotatively activated by the clutch means described in the foregoing.

To effectively dissipate the heat generated by repeated retarding and braking, a brake-cooling fluid is circulated as by a pump 88 from the outlet port 77 of housing assembly 2, through a heat exchanger 89 and then returned into the brake housing through inlet port 76.

Accordingly, one practical embodiment of my improved combined retarder and auxiliary or emergency brake has been described in detail as to construction and operation. It can be readily seen that an effective shaft-mounted brake assembly and control system therefor is attained which achieves the objectives and advantages as outlined in the preamble of this specification. An additional advantage of this system resides in the fact that in the event of a failure in the air system, the clutch will automatically engage, thus automatically conditioning the retarder and brake assembly for hydraulic operation and enabling the vehicle to be stopped by this improved retarder and auxiliary brake combination. On the other hand, in the event the hydraulic system of the retarder-brake unit becomes disabled, the regular service brakes can still be operated by the air system to bring the vehicle under control.

While the specific details have been herein shown and described, the invention is not confined thereto as various changes and alterations may be made without departing from the spirit and scope thereof as defined in the appended claims.

I claim:

1. A combined retarder and auxiliary brake assembly of the class described, comprising a hollow stationary housing, a rotary drive member journaled within said housing, relatively rotatable inter-engageable brake friction discs within said housing, at least one of said friction discs having means for operative connection with the rotary member and constituting a brake rotor disc, said means including friction clutch means operatively and radially interposed between the brake rotor disc and the rotary drive member, clutch operator means to selectively engage and disengage the clutch means to effect rotation and non-rotation respectively of the brake rotor disc with the rotary member aforesaid, and separate brake operator means independent of the clutch operator means for effecting inter-engagement and disengagement of the brake friction discs.

2. A combined retarder and auxiliary brake assembly as defined in claim 1, wherein the housing includes a pair of opposed radially extended plates, one of said plates constituting a fixed brake pressure plate, and wherein said brake friction discs include a primary actuator disc disposed between the brake rotor disc and the other of said housing plates, said actuator disc being axially shiftable to operatively interengage the brake discs and the pressure plate responsive to the brake operator means.

3. A combined retarder and auxiliary brake assembly as defined in claim 1, wherein the housing includes a pair of opposed radially extended plates, one of said plates constituting a fixed brake pressure plate and the other of said plates constituting a back-up plate, one of said brake friction discs comprises a yieldable axially shiftable primary actuator disc disposed contiguous to and intermediate the brake rotor disc and the housing back-up plate, and camming means cooperatively interposed between the primary actuator disc and the back-up plate for axially shifting the actuator disc into engagement with the rotor disc responsive to the operation of the brake operator means.

4. A combined retarder and auxiliary brake assembly as defined in claim 1, wherein the housing includes a pair of opposed radially extended plates, one of said plates constituting a fixed brake pressure plate and the other of said plates constituting a back-up plate, one of said brake friction discs comprising a yieldable axially shiftable and slightly rotatable primary actuator disc disposed contiguous to and intermediate the brake rotor disc and the housing back-up plate, and self-energizing camming means cooperatively interposed between the primary actuator disc and the back-up plate both for axially shifting the actuator disc into engagement with the rotor disc and for self-energizing the same responsive to the operation of the brake operator means.

5. A combined retarder and auxiliary brake assembly as defined in claim 1, wherein the housing includes a pair of opposed radially extended plates, one of said plates constituting a fixed brake pressure plate and the other of said plates constituting a back-up plate, one of said brake friction discs comprises a yieldable axially shiftable primary actuator disc disposed contiguous to and intermediate the brake rotor disc and the housing back-up plate, camming means cooperatively interposed between the primary actuator disc and the back-up plate for axially shifting the actuator disc into engagement with the rotor disc responsive to the operation of the brake operator means, and wherein said operator means includes an axially movable annular piston disposed within a complementary annular piston chamber in the back-up housing plate, said piston being operatively disposed in abutting contact with the primary actuator disc at one side thereof, an axially movable annular sealing member disposed within the piston chamber contiguous to the piston, and means in said housing for directing an operating pressure fluid into said piston chamber and against said sealing member and piston.

6. A combined retarder and auxiliary brake assembly as defined in claim 1, wherein the clutch means includes relatively rotatable and releasably inter-engageable clutch friction elements, and wherein the clutch operator means includes pneumatic power means.

7. A combined retarder and auxiliary brake assembly of the class described, comprising a hollow stationary housing, a rotary drive member journaled within said housing, relatively rotatable inter-engageable brake friction discs within said housing, at least one of said friction discs having means for operative connection with the rotary member and constituting a brake rotor disc, said means including friction clutch means operatively and radially interposed between the brake rotor disc and the rotary drive member, clutch operator means to selectively engage and disengage the clutch means to effect rotation and non-rotation respectively of the brake rotor disc with the rotary member aforesaid, brake operator means for effecting inter-engagement and disengagement of the brake friction discs, said clutch means including relatively rotatable and releasably inter-engageable clutch friction elements, a clutch actuator assembly including an axially movable and slightly rotatable actuator disc and an axially shiftable actuator sleeve operatively disposed between and connected with the clutch friction elements and the clutch operator means, and said clutch operator means including pneumatic power means.

8. A combined retarder and auxiliary brake assembly of the class described, comprising a hollow stationary housing, a rotary drive member journaled within said housing, relatively rotatable inter-engageable brake friction discs within said housing, at least one of said friction discs having means for operative connection with the rotary member and constituting a brake rotor disc, said means including friction clutch means operatively interposed between the brake rotor disc and the rotary drive member, clutch operator means to selectively engage and disengage the clutch means to effect rotation and non-rotation respectively of the brake rotor disc with the rotary member aforesaid, brake operator means for effecting inter-engagement and disengagement of the brake friction discs, said clutch means including a rotatable but axially fixed motion transmitting member in the form of a combined hollow clutch housing and brake rotor disc carrier member journaled upon and within the brake housing, said clutch housing comprising a pair of radially extended and axially opposed end plates, one of said plates constituting a clutch pressure plate having its outer margin extended axially toward and abutting against the other plate, said extended margin having means for positive inter-connection with the aforesaid brake rotor disc, and said other plate constituting a secondary clutch back-up plate.

9. A combined retarder and auxiliary brake assembly of the class described, comprising a hollow stationary housing, a rotary drive member journaled within said housing, relatively rotatable inter-engageable brake friction discs within said housing, at least one of said friction discs having means for operative connection with the rotary member and constituting a brake rotor disc, said means including friction clutch means operatively interposed between the brake rotor disc and the rotary drive member, clutch operator means to selectively engage and disengage the clutch means to effect rotation and non-rotation respectively of the brake rotor disc with the rotary member aforesaid, brake operator means for effecting inter-engagement and disengagement of the brake friction discs, said clutch means including a rotatable but axially fixed motion transmitting member in the form of a combined hollow clutch hosuing and brake rotor disc carrier journaled upon and within the brake housing, said clutch housing comprising a pair of radially extended and axially opposed end plates, one of said plates constituting a clutch pressure plate and having its outer margin extended axially toward and abutting against the other plate, said extended margin having means for positive inter-connection with the aforesaid brake rotor disc, said other clutch housing plate constituting a secondary clutch back-up plate, said clutch means further comprising relatively rotatable friction clutch elements including an axially shiftable clutch rotor disc slidably mounted upon the rotary drive member and connected thereto for rotation therewith, said clutch rotor disc being disposed within the clutch housing adjacent the clutch pressure plate, an axially movable primary clutch disc disposed adjacent to the clutch rotor disc, and resilient biasing means interposed between said primary clutch disc and said clutch back-up plate for normally urging the clutch elements into clutching engagement with each other and with the pressure plate of the clutch housing.

10. A combined retarder and auxiliary brake assembly of the class described, comprising a hollow stationary housing, a rotary drive member journaled within said housing, relatively rotatable inter-engageable brake friction discs within said housing, at least one of said friction discs having means for operative connection with the rotary member and constituting a brake rotor disc, said means including friction clutch means operatively interposed between the brake rotor disc and the rotary drive member, clutch operator means to selectively engage and disengage the clutch means to effect rotation and non-rotation respectively of the brake rotor disc with the rotary member aforesaid, brake operator means for effecting inter-engagement and disengagement of the brake friction discs, said clutch means including a rotatable but axially fixed motion transmitting member in the form of a combined hollow clutch housing and brake rotor disc carrier journaled upon and within the brake housing, said clutch housing comprising a pair of radially extended and axially opposed end plates, one of said plates constituting a clutch pressure plate and having its outer margin extended axially toward and abutting against the other plate, said extended margin having means for positive inter-connection with the aforesaid brake rotor disc, said other clutch housing plate constituting a secondary clutch back-up plate, said clutch means further comprising relatively rotatable friction clutch elements including an axially shiftable and slightly rotatable clutch rotor disc slidably mounted upon the rotary drive member and connected thereto for rotation therewith, said clutch rotor disc being disposed within the clutch housing adjacent the clutch pressure plate, an axially movable primary clutch disc disposed adjacent to the clutch rotor disc, camming means interposed between the primary clutch disc and the clutch back-up plate to effect self-energization of the clutch elements responsive to drag torque imparted to the clutch primary disc by the clutch rotor disc, and resilient biasing means interposed between said primary clutch disc and said clutch back-up plate for normally urging the clutch elements into clutching engagement with each other and with the pressure plate of the clutch housing.

11. A combined retarder and auxiliary brake assembly of the class described, comprising a hollow stationary housing, a rotary drive member journaled within said housing, relatively rotatable inter-engageable brake friction discs within said housing, at least one of said friction discs having means for operative connection with the rotary member and constituting a brake rotor disc, said means including friction clutch means operatively interposed between the brake rotor disc and the rotary drive member, clutch operator means to selectively engage and disengage the clutch means to effect rotation and non-rotation respectively of the brake rotor disc with the rotary member aforesaid, brake operator means for effecting inter-engagement and disengagement of the brake friction discs, said clutch means including relatively rotatable releasably inter-engageable clutch friction elements, said clutch operator means comprising an axially shiftable actuator sleeve disposed concentrically about the rotary drive member, said sleeve also being concentric with and having one end extending within the clutch housing, one of the clutch friction elements having means for supporting the same on the end of the sleeve within the clutch housing, thrust receiving means affixed on the other end of said actuator sleeve, an axially shiftable clutch actuator disc disposed adjacent the thrust receiving means in a direction toward the clutch housing, and means for shifting said actuator disc axially against said thrust means to effect disengagement of the clutch elements.

12. A combined retarder auxiliary brake assembly of the class described, comprising a hollow stationary housing, a rotary drive member journaled within said housing, relatively rotatable inter-engageable brake friction discs within said housing, at least one of said friction discs having means for operative connection with the rotary member and constituting a brake rotor disc, said means including friction clutch means operatively interposed between the brake rotor disc and the rotary drive member, clutch operator means to selectively engage and disengage the clutch means to effect rotation and non-rotation respectively of the brake rotor disc with the rotary member aforesaid, brake operator means for effecting inter-engagement and disengagement of the brake friction discs, said clutch means including relatively rotatable releasably inter-engageable clutch friction elements, said clutch operator means comprising an axially shiftable actuator sleeve disposed concentrically about the rotary drive member, said sleeve also being concentric with and having one end extending within the clutch housing, one of the clutch friction elements having means for supporting the same on the end of the sleeve within the clutch housing, thrust receiving means affixed on the other end of said actuator sleeve, an axially shiftable and slightly rotatable clutch actuator disc disposed adjacent the thrust receiving means in a direction toward the clutch housing, means for shifting said actuator disc axially against said thrust means to effect disengagement of the clutch elements, said actuator disc shifting means including a stationary pressure plate and actuator disc support on said brake assembly housing intermediate the clutch housing and the clutch actuator disc aforesaid, and camming means interposed between the clutch actuator disc and the pressure plate for effecting axial movement of said actuator disc and sleeve responsive to rotation of the actuator disc relative to the pressure plate.

13. A combined retarder and auxiliary brake assembly of the class described, comprising a hollow stationary housing, a rotary drive member journaled within said housing, relatively rotatable inter-engageable brake friction discs within said housing, at least one of said friction discs having means for operative connection with the rotary member and constituting a brake rotor disc, said means including friction clutch means operatively interposed between the brake rotor disc and the rotary drive member, clutch operator means to selectively engage and disengage the clutch means to effect rotation and non-rotation respectively of the brake rotor disc with the rotary member aforesaid, brake operator means for effecting inter-engagement and disengagement of the brake friction discs, said clutch means including relatively rotatable releasably inter-engageable clutch friction elements, said clutch operator means comprising an axially shiftable actuator sleeve disposed concentrically about the rotary drive member, said sleeve also being concentric with and having one end extending within the clutch housing, one of the clutch friction elements having means for supporting the same on the end of the sleeve within the clutch housing, thrust receiving means affixed on the other end of said actuator sleeve, an axially shiftable and slightly rotatable clutch actuator disc disposed adjacent the thrust receiving means in a direction toward the clutch housing, means for shifting said actuator disc axially against said thrust means to effect disengagement of the clutch elements, said actuator disc shifting means including a stationary pressure plate and actuator disc support on said brake assembly housing intermediate the clutch housing and the clutch actuator disc aforesaid, camming means interposed between the clutch actuator disc and the pressure plate for effecting axial movement of said actuator disc and sleeve responsive to rotation of the actuator disc relative to the pressure plate, and a pair of opposed substantially parallel thrust arms extending in opposite directions from the exterior into the interior of the assembly housing and cooperatively engageable with the clutch actuator disc to impart rotation thereto.

14. A combined retarder and auxiliary brake assembly of the class described, comprising a hollow stationary housing, a rotary drive member journaled within said housing, relatively rotatable inter-engageable brake friction discs within said housing, at least one of said friction discs having means for cooperative connection with the rotary member and constituting a brake rotor disc, said means including friction clutch means operatively interposed between the brake rotor disc and the rotary drive member, clutch operator means to selectively engage and disengage the clutch means to effect rotation and non-rotation respectively of the brake rotor disc with the rotary member aforesaid, brake operator means for effecting inter-engagement and disengagement of the brake friction discs, said clutch means including relatively rotatable releasably inter-engageable clutch friction elements, said clutch operator means comprising an axially shiftable actuator sleeve disposed concentrically about the rotary drive member, said sleeve also being concentric with and having one end extending within the clutch housing, one of the clutch friction elements having means for supporting the same on the end of the sleeve within the clutch housing, thrust receiving means affixed on the other end of said actuator sleeve, an axially shiftable and slightly rotatable clutch actuator disc disposed adjacent the thrust receiving means in a direction toward the clutch housing, means for shifting said actuator disc axially against said thrust means to effect disengagement of the clutch elements, said actuator disc shifting means including a stationary pressure plate and actuator disc support on said brake assembly housing intermediate the clutch housing and the clutch actuator disc aforesaid, camming means interposed between the clutch actuator disc and the pressure plate for effecting axial movement of said actuator disc and sleeve responsive to rotation of the actuator disc relative to the pressure plate, a pair of opposed substantially parallel thrust arms extending in opposite directions from the exterior into the interior of the assembly housing and cooperatively engageable with the clutch actuator disc to impart rotation thereto, and pneumatic operator means mounted exteriorly of the housing for operating the thrust arms.

15. A combined retarder and auxiliary brake assembly of the class described, comprising a hollow stationary housing, said housing having means for directing the entry and exit of a hydraulic brake coolant, sealing means in said housing to prevent leakage of said coolant, a rotary drive member journaled within said housing, relatively rotatable inter-engageable brake friction discs within said housing, at least one of said friction discs having means for operative connection with the rotary member and constituting a brake rotor disc, said means including friction clutch means operatively and radially interposed between the brake rotor disc and the rotary drive member, means for sealing the clutch means against entry of the brake coolant, clutch operator means to selectively engage and disengage the clutch means to effect rotation and nonrotation respectively of the brake rotor disc with the rotory member aforesaid, and separate brake operator means independent of the clutch operator means for effecting interengagement and disengagement of the brake friction discs.

16. A combined retarder and auxiliary brake assembly of the class described, comprising a stationary housing including a pair of opposed plates, a rotary drive shaft journaled within said housing, relatively rotatable inter-engageable friction members disposed intermediate said housing plates, at least one of said friction members constituting a rotor disc and having provision for operative connection with the rotary drive shaft and another of said friction members being relatively stationary but axially movable, another of said friction members constituting an axially movable and only slightly rotatable actuator disc disposed adjacent to one of the housing plates and normally yieldably biased toward the latter, servo brake operator means for initially shifting the actuator disc toward the other of said housing plates to effect frictional inter-engagement of the friction members and said latter plate, and friction clutch means for selectively effecting rotation and non-rotation of the brake rotor disc, said clutch means including a rotatable but axially fixed combined hollow clutch housing and brake-rotor-disc carrier journaled upon and within the brake housing, said clutch housing including a clutch pressure plate and a clutch back-up plate arranged in opposed spaced relation to each other, means joining the outer peripheries of said latter plates and having provision for positive drive connection with the brake rotor disc aforesaid, said clutch means further including an axially shiftable clutch rotor disc carried on the drive shaft and within said clutch housing adjacent to the pressure plate, and clutch actuator means, said clutch actuator means comprising an axially shiftable actuator sleeve carried by the clutch housing concentrically around the drive shaft, one end of said sleeve extending interiorly of the clutch housing, a slightly rotatable and axially movable primary clutch disc carried on the end of said sleeve within the clutch housing and disposed intermediate the clutch rotor disc and clutch back-up plate, spring means interposed between the back-up plate and the clutch primary disc for normally biasing the latter into inter-engagement with the clutch rotor disc and pressure plate, camming means carried on and disposed intermediate the clutch primary disc and back-up plate for effecting self-energization of the clutch means responsive to drag torque imparted to the primary clutch disc from the clutch rotor disc, thrust bearing means affixed on the opposite end of said actuator sleeve, a stationary actuator-disc-support and back-up plate disposed intermediate the thrust bearing means and clutch housing and constituting a part of the brake housing, an axially shiftable and slightly rotatable clutch actuator disc carried upon the actuator disc support contiguous to the thrust bearing, camming means interposed between the clutch actuator disc and its back-up plate for shifting the actuator disc and the thrust bearing together with the actuator sleeve and clutch primary disc away from the pressure plate of the clutch housing and against the bias of the clutch spring means, a pair of substantially diametrically opposed thrust pads disposed upon the reverse side of the clutch actuator disc from the camming means, and clutch operator means, said operator means including a pair of substantially parallel opposed thrust arms extending into the interior of the brake housing in opposite directions and disposed for cooperative engagement with said thrust pads on the clutch actuator disc, and pneumatic power means for imparting thrust to the respecttive thrust arms for effecting rotation of said actuator disc with consequent disengagement of said clutch means and attendant non-rotation of the brake rotor disc.

References Cited in the file of this patent

UNITED STATES PATENTS

| 2,239,235 | Lambert | Apr. 22, 1941 |
| 2,320,286 | Lambert | May 25, 1943 |
| 2,679,769 | Parrett | June 1, 1954 |
| 2,890,769 | Hause | June 16, 1959 |

FOREIGN PATENTS

| 727,628 | Great Britain | Apr. 6, 1955 |